(12) United States Patent
Rodriguez

(10) Patent No.: US 11,074,316 B1
(45) Date of Patent: *Jul. 27, 2021

(54) ACTIVATE A CROSS BROWSER PLATFORM TO ENABLE INTERFACES

(71) Applicant: Lazaro Rodriguez, Hialeah, FL (US)

(72) Inventor: Lazaro Rodriguez, Hialeah, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/892,121

(22) Filed: Jun. 3, 2020

Related U.S. Application Data

(63) Continuation of application No. 16/039,270, filed on Jul. 18, 2018, now Pat. No. 10,929,496, which is a continuation-in-part of application No. 14/196,466, filed on Mar. 4, 2014, now abandoned.

(60) Provisional application No. 61/748,174, filed on Jan. 2, 2013.

(51) Int. Cl.
*G06F 16/957* (2019.01)
*G06Q 50/18* (2012.01)
*G06F 3/0482* (2013.01)
*G06F 16/93* (2019.01)
*G06F 16/958* (2019.01)

(52) U.S. Cl.
CPC ........ *G06F 16/9577* (2019.01); *G06F 3/0482* (2013.01); *G06F 16/93* (2019.01); *G06F 16/986* (2019.01); *G06Q 50/18* (2013.01)

(58) Field of Classification Search
None
See application file for complete search history.

(56) References Cited

U.S. PATENT DOCUMENTS

| | | | | |
|---|---|---|---|---|
| 2003/0055701 A1* | 3/2003 | Dutta | ................. | G06Q 30/0284 705/1.1 |
| 2003/0125981 A1* | 7/2003 | Pedrazzoli Pazos | .. | G06Q 10/10 705/34 |
| 2004/0049401 A1* | 3/2004 | Carr | ......................... | G07C 9/22 705/325 |
| 2005/0273621 A1* | 12/2005 | Davis | ..................... | G07C 9/257 713/182 |
| 2007/0192872 A1* | 8/2007 | Rhoads | .............. | H04N 1/32144 726/26 |
| 2008/0219543 A1* | 9/2008 | Csulits | ..................... | G07D 7/00 382/135 |
| 2008/0238690 A1* | 10/2008 | Plant | .................. | G07C 9/00563 340/573.1 |
| 2010/0280964 A1* | 11/2010 | Register, Jr. | ......... | G06Q 30/018 705/317 |
| 2013/0042966 A1* | 2/2013 | Look | ..................... | B60R 13/105 156/227 |
| 2013/0073347 A1* | 3/2013 | Bogaard | ................ | G06Q 40/02 705/13 |

(Continued)

OTHER PUBLICATIONS

Sujeet Kumar Sharma, Ali Al-Badi, Nripendra P. Rana, Laila Al-Azizi, Mobile applications in government services (mG-App) from user's perspectives: A predictive modelling approach, Government Information Quarterly, vol. 35, Issue 4, 2018, pp. 557-568, ISSN 0740-624X. (Year: 2018).*

*Primary Examiner* — Andrew B Whitaker

(57) ABSTRACT

An interface or platform to process and satisfy the citation requirements and accept payment.
The submission and verification of documentary evidence to satisfy at least one outstanding citation using the camera sensors on a computing device.

20 Claims, 3 Drawing Sheets

(56) References Cited

U.S. PATENT DOCUMENTS

2013/0146204 A1* 6/2013 Whelan .................... G09F 3/08
                                                         156/60
2013/0151426 A1* 6/2013 Whelan ................ G06Q 30/018
                                                        705/317

* cited by examiner

ACTIVATE A CROSS BROWSER PLATFORM TO ENABLE INTERFACES

OTHER RELATED APPLICATIONS

The present application is a continuation of U.S. patent application Ser. No. 16/039,270, filed on Jul. 18, 2018, which is hereby incorporated by reference. U.S. patent application Ser. No. 16/039,270 is the continuation-in-part of U.S. patent application Ser. No. 14/196,466, filed on Mar. 4, 2014, which is hereby incorporated by reference. U.S. patent application Ser. No. 14/196,466 is the parent application of provisional application 61/748,174 filed on Jan. 2, 2013 that is also incorporated by reference.

BACKGROUND OF THE INVENTION

1. Field of the Invention

The present invention relates to a system that enables a cross-browser dialog platform for the submission and verification of documentary evidence to satisfy at least one outstanding citation.

2. Description of the Related Art

Several designs for cross-browser dialog platforms have been designed in the past. None of them, however, include a system using submission and verification of documentary evidence to satisfy at least one outstanding citation or to satisfy the safety requirements of a vehicle to be operational that when verified through a Dots Per Inch Requirement using vehicle or government color placards through a network protocols for the minimum or least amount of bandwidth for clarity, a web dialog composites a new web page to enable to process. For example, to process the payment under the right category code and pay class and presenting a new web page within the dialog to be able to synchronize the database with an agency database. The agency database is associated with at least one of a state, city, county, or government jurisdiction.

3. Description of Background

Also, operating systems and their browsers like but not limited to Microsoft Windows Edge browser can require a user to download an application from their approved store. If a computing device is not updated with previous updates, the computing device can have trouble presenting a graphical user interface's and its capabilities, pops ups, functions, colors, graphics, texts, etc.

Government jurisdictions have a break down in communications within their departments in synchronizing databases for requirements associated with at least one violation to satisfy the citation or the safety requirements for a vehicle.

As the automation and driver-less vehicle continue to progress. There will be a system needed to process and verify the safety requirements of a vehicle directly into the database, operating system, client program, of an automated driver less-vehicle. It will be understood that this example of a driver-less is not limited to a vehicle with the capabilities of an individual taking control of the vehicle.

Government jurisdictions have many different databases within their own departments at County, Clerks, Collections, Courts, Traffic Tickets, Police Departments, Service Locations, etc. None of them have a way to process information in constant manner with a user's computing device if but not limited to the computing device that is being used is missing updates, is no longer receiving updates from an operating system or manufacture to receive documentation required to satisfy the citation and update the current status for at least one of a driver license, registration, insurance, or proof of compliant equipment in one central place to synchronizing databases for all the government jurisdictions in a state or country.

Government jurisdictions do not have the resources or economic means to create their own systems and technologies to keep with the constant updates of computing devices. States and local governments have outdated technologies that is not able to process different types of files so users are limited which computing devices or computer programs they can use to satisfy their citation. For example, their technologies might not be compatible on a smart phone, tablet, smart watch, and near-field communications, process all image document types, accept payment from different providers, process information in their existing case management system, etc. For example a lot of case management systems can only process and accept a PDF document or a TIFF format. A lot of case management systems require that you send executable program in a certain amount of bits to a decompiler to process information in a case management system.

Government jurisdictions within one sector may have one database for payments, a different database to store images, a different database for the Judges and courts. So, if one department wanted to sync with another, they would have to create an interface and a web dialog to wrap around another web dialog. Many government jurisdictions and agencies do not have the resources and economic means to create an interface web application, web app view, or web dialog every time a new technology emerges to satisfy requirements associated with a citation.

Laws or court decisions for a specific case/citation are constantly changing requiring different payment amounts for citations, late fees, court fees, etc. Every time there is a change in Laws or fees, government jurisdiction's departments have to get approval to implement new projects to update systems and departments. So, departments have to wait to improve efficiency.

Many government jurisdictions and agencies do not have the resources and economic means to allow new technologies an interface to connect to synchronize agency databases there limiting growth in the community with businesses, putting them at a disadvantage with other counties, not being able to collect funds efficiently, etc.

A lot of employees within a government jurisdiction use different web browsers or outdated web browsers because of budget cuts, no tech department, outdated technologies like case management systems. Employees in different departments do not have the means to update, enable, or process other department interfaces for satisfy citations in a consistent manner for communication for interfaces or deploy new technologies within existing interfaces. A lot of systems can create confusion if too many options are available for a particular citation to be satisfied. A user can click on the wrong category or allocation code creating an inappropriate dollar might to be paid or to synchronize to the wrong agency database. These scenarios can cause a lot of problems to a user not being able to use their vehicle or a government agency not being able to collect the correct fine amount or overcharging a user/customer.

Many instances happen where an individual in a court proceeding presents requirements regarding a citation or the safety of a vehicle, and a court process information but that information does not reflect in a timely manner to be paid and synchronize an agency database. Also, the opposite can happen where a court proceeding is not able to access the updated requirements submitted by a user, computing device, computing mechanism, operating system, or client program. Therefore, a court proceeding might have to be delayed or additional court fees may be applied.

It could be very expensive for government agencies to but not limited to in trying to keep up with new technologies, assigning employee roles, allocating payment codes, categories for agency databases, etc.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a cross-browser dialog platform that supports the location and enablement of sub-contents by hosting web pages in a dialog, such that a web page may be used inside or outside a dialog to submit, verify, manipulate, and synchronize of a vehicle documentary object. According to some embodiments select elements on the hosted page may be hidden when in a dialog and invoked behavior from an input or request may be specified for hyperlinks inside or outside the dialog, and at the same time displaying the proper size of the dialog for computing device. According to some embodiments an operating system program can be executed to locate a content within a database to be displayed in the web page and dialog.

Embodiments are directed to a cross-browser dialog platform that supports hosting web pages in a dialog, such that a web page may be used inside or outside a dialog to enable interfaces to process the submission and verification of documentary evidence to satisfy at least one outstanding citation and vehicle safety requirement to post the payment under the right category code and pay class. According to some embodiments select elements on the hosted page may be hidden when in a dialog and invoked behavior from an input or request may be specified for hyperlinks inside or outside the dialog, and at the same time displaying the proper size of the dialog for computing device.

Embodiments are directed to a cross-browser Web app view platform that supports the location and enablement of sub-contents by hosting web pages in a web app view, such that a web page may be used inside or outside a web app view to submit, verify, manipulate, and synchronize of a vehicle documentary object. According to some embodiments select elements on the hosted page may be hidden when in a web app view and invoked behavior from an input or request may be specified for hyperlinks inside or outside the web app view, and at the same time displaying the proper size of the web app view for computing device. According to some embodiments an operating system program can be executed to locate a content within a database to be displayed in the web page and web app view.

Embodiments are directed to a cross-browser web app view platform that supports hosting web pages in a web app view, such that a web page may be used inside or outside a web app view to enable interfaces to process the submission and verification of documentary evidence to satisfy at least one outstanding citation and vehicle safety requirement to post the payment under the right category code and pay class. According to some embodiments select elements on the hosted page may be hidden when in a web app view and invoked behavior from an input or request may be specified for hyperlinks inside or outside the web app view, and at the same time displaying the proper size of the web app view for computing device.

Embodiments are directed to a cross-browser a web app view or dialog platform that supports a controller containing at least one memory, said memory containing an operation system. Further embodiment includes said memory containing a client program. According to some embodiments operating system and client program being a secure web browser that communicates with a microcontroller or microprocessor hosted within web app view or dialog. The memory stores authentication information including but not limited to password, encrypted key, certificate, endpoint information in controller or database. According to some embodiments a controller having the ability to send instruction to secure web browser to terminate session when time stamps generated by encryption program is outside of a predetermined time frame. Also, to continuously verify a user included but not browser, javascript, html, css, c++, java, etc.

Embodiments are directed to a cross-browser a web app view or a dialog platform that supports a secure web browser that communicates with a vehicle documentary object and synchronize an agency database or government jurisdiction. Agency database and Government Jurisdiction database include but not limited to a city and state.

Embodiments are directed to a cross-browser a web app view or a dialog platform that supports checking the Dots Per Inch (DPI) for clarity for the requirement for an image to synchronize a database. The checking of the clarity includes but not limited to running a program of a hosted web page or program in the web app view or dialog sub-contents. The checking of the clarity includes but not limited using the sensors on a device. The sensors include but not limited to accelerometer, gyroscope, magnetometer, and GPS. The checking of the clarity includes but not limited the user holding the vehicle documentary object in different behavior positions to capture holograms, seals, certificates, branding information that makes the vehicle documentary valid with a government jurisdiction. For example, the web application may require the user to hold the vehicle documentary in a certain angle and using the sensors of a device to confirm angle and lighting. Angles can include but not limited to 90 degrees, compass direction, measuring distance from device and document. Lighting includes but not limited using the property record of a property to review the architecture of structure to guide the person in terms of squarefeet to the appropriate window, light fixture, bedroom light, kitchen light, etc. at a certain time of the day. To guide the customer, the web application can run a camera sensor function, exe, java, javascript, html, script from browser, html, xml, css, json schema, xml schema. Running a program hosted on the web page to be able to check for clarity can include but not limited to a program within or a third party.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object. At the same time displaying the appropriate graphical user interface to an authorized user. For example, if the vehicle documentary is related to Driver License display in the sub-contents programs to check holograms, DPI, valid with a state, city or government jurisdiction database. For example if the vehicle documentary is related to insurance and tag/registration, there may be no need to display sub-contents to check holograms. For example if the vehicle document is related to improper equipment, there may be no need to display an affidavit or document similar to an affidavit, generate a notarization program or link. Each GUI can be predeterminded which government jurisdiction data base to be synchronized with or determined by an authorized user. By displaying the appropriate GUI for authorized user, reduces the risk of error, allocating the incorrect pay class and category for a system or case management system.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object. At the same time displaying the appropriate graphical user interface to an authorized user. The GUI can allow one authorized user or multiple users at one time. The GUI can inform the users who is currently viewing and editing information. There can be permissions set for each authorized user.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to near-field communication, biometrics, and bluetooth. NFC allows an authorized user, for example a police officer to submit and verify vehicle documentary object for safety or to satisfy requirements for a citation on the road, office or particular location. Using these types of connection to instruct a user to use web application and authorizing police officer to use platform.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited using an operating system program or client program inside a vehicle to transmit performance safety scan and transmitting that information directly to platform when a web application is opened using a device within a vehicle or a device associated with that vehicle by a user. The device includes but not limited to a computing device. The user's device may or may not be associated with vehicle. If user device not associated includes but not limited by a means for authorizing can be generated by user of that vehicle, push notifications, biometrics, nfc, bluetooth, etc.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to a host data replicator to copy relational data between the mainframe and the SQL, Linux, server database. It could also be used to create a secure VPN connection. Includes but not limited to unixODBC Project, setting up a linux or UNIX environment, display database command, DB2 databases, table spaces, XML table spaces, LOB table spaces, Index spaces within a database, Indexes on auxiliary tables, Partitions of partitioned table spaces, Partitions of index spaces.

All Embodiments: According to some Embodiments select elements on the hosted page may be hidden when in a dialog and invoked behavior from an input or request may be specified for hyperlinks inside or outside the dialog, and at the same time displaying the proper size of the dialog for computing device.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to satisfy the requirements for a citation.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to satisfy the requirements of a driverless vehicle.

Embodiments are directed to a cross-browser dialog platform that supports the location and enablement of sub-contents by hosting web pages in a dialog or web app view, such that a web page may be used inside or outside a dialog or web dialog to specifying separate behaviors for the links includes: defining the separate behaviors based on one of: a markup language attribute for each link and a parameter on each link's query string. on page load of the web page, iterating through anchor tags on the web page to determine links with a relevant one of a markup language attribute and a query string key; and modifying one of the markup language attribute and the parameter for each of the links on the web page to employ a dialog-specific behavior when selected.

Embodiments are directed to a cross-browser dialog platform that supports the location and enablement of sub-contents by hosting web pages in a dialog or web app view, such that a web page may be used inside or outside a dialog or web dialog to specifying separate behaviors for the links includes: defining the separate behaviors based on one of: a Dots Per Inch attribute for each link and document object model parameter on each link's query string. on page load of the web page, iterating through anchor tags on the web page to determine links with a relevant one of a markup language attribute and a query string key, and modifying one of the markup language attribute and the parameter for each of the links on the web page to employ a dialog-specific behavior when selected.

Embodiments are directed to a cross-browser dialog platform that supports the location and enablement of sub-contents by hosting web pages in a dialog or web app view, such that a web page may be used inside or outside a dialog or web dialog to specifying separate behaviors for the links includes and to serve the composite of a new web page based on vehicle object with activation based on color placards through assessing visual acuity using a video image of a optotype chart obtained with the standard focal length and aperture of computing device and compare the remote images transmitted using various bandwidths and connection protocols.

The invention is a system and method for measuring visual acuity. The system comprises a computer or a projector adapted to project a computer generated image of an optotype on a surface, e.g. a computer display screen or a screen on a wall at any custom distance, fixed distance, or an automated distance.

The projector comprises a zoom lens that enables continuous digital or optical zoom in the range of 20× or standard, or non standard. The projector is adapted to allow the operator to select the rate at which the zoom will automatically change in either a linear or logarithmic manner. The direction of the change of the zoom can be from the largest size of the optotype to the smallest or vice versa. The optotypes are constructed according to Snellen standards or Visual Standards and can be in any form, e.g. numerals, images, emojis, or letters in any language or symbols. However since the Hindu-Arabic numerals (0, 1, 2, 3, 4, 5, 6, 7, 8, 9) are familiar to almost every person in the world as evidenced by their appearance on the bank notes of most countries, their use as optotypes are suggested.

The computing device comprises a zoom lens that enables continuous digital or optical zoom in the range of 20× or standard. Includes but not limited to: standard or non standard focal length and aperture of computing device; The projector is adapted to allow the operator to select the rate at which the zoom will automatically change in either a linear or logarithmic manner. The direction of the change of the zoom can be from the largest size of the optotype to the smallest or vice versa. The optotypes are constructed according to Snellen standards or Visual Standards and can be in any form, e.g. numerals, images, emojis, or letters in any language or symbols. However since the Hindu-Arabic numerals (0, 1, 2, 3, 4, 5, 6, 7, 8, 9) are familiar to almost every person in the world as evidenced by their appearance on the bank notes of most countries, then use as optotypes are suggested.

It is also noted that the optotypes can also be displayed to the client using a computer and computer, television, or similar display screen as long as the computer is programmed to continuously vary the size of the optotype at a known rate and not to display a series of optotypes with different sizes in a "staircase" manner or limited manner.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform", "Composite", "Look and Feel" may be a combination of software and hardware components for managing computer and network operations, which may provide web applications with hosted web pages and dialog interactions. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

While the embodiments will be described in the general context of program modules, color placards, bandwidth protocols, vehicle safety standards, vehicle citation compliance documents or documents, that execute in conjunction with an application program that runs on an operating system on a personal computer, those skilled in the art will recognize that aspects may also be implemented in combination with other program modules.

The placards or placards included but not limited to government traffic signs, posters, graphics, computer graphics, non government generated placards instead private companies placards placed on vehicles, signs, posters, computing devices, etc. Placards can be in the standard colors for hazards blue, yellow, green, and red, or can be in custom colors, or automated generated colors based on a user experience, website, application, and computing device. Placard images can be used with the lighting of a property layout or without a property layout directed by computing device to take a picture of an object by asking a user to first take a picture of an image inside or outside property and use the lighting to compare images for transmission protocols instead of images stored remotely, local, or cloud. Then, update data store, database, server with images taken by a user to compare and serve composite web site, dialog, web app view, web application, application.

All Embodiments: According to some embodiments can be generally understood with the scope of the invention without placing limitations thereon.

All Embodiments: According to some Embodiments includes but not limited to all embodiments described.

All Embodiments: According to some Embodiments include but not limited to activating a link and serving a composite look and feel description of a data store based on the vehicle citation and safety documentation object associated with the least bandwidth possible while retaining clarity through color placards, assessing visual acuity using a video image of a optotype chart with focal length and aperture.

All Embodiments: According to some Embodiments of objects of the invention will be brought out from the following detailed description and a review of the associated drawings. Tt is for the purpose of fully disclosing the invention without placing limitations thereon.

All Embodiments: According to some Embodiments include but not limited to a server for providing a web application executing a script within a cross-browser web dialog platform.

All Embodiments: According to some Embodiments include but not limited to java, javascript, script within browser, executable program, operating system program, secure web browser, css, json schema, xml schema, object oriented model, php, a document analysis and optical character recognition (OCR) system, and document object oriented model.

Further objects of the invention will be brought out from the following detailed description and a review of the associated drawings. It is for the purpose of fully disclosing the invention without placing limitations thereon.

All Embodiments: According to all or some embodiments included to but not limited to all of this document, description, claims, summary drawings, detailed description thereon.

All Embodiments or According to some embodiments having instructions to terminate or turn off automatically a serve a composite web page activation if clarity placards, protocols, or vehicle object is not obtained includes but not limited to a executable program, encryption program, secure web browser, scriptin within browser, script within dialog, or script within new web page, from a hosted web page, contents, or sub-contents inside dialog, web app view, web site, and web application.

All Embodiments or According to some embodiments having instructions to continue automatically to serve a composite web page activation if clarity, placards, protocols, or vehicle object, is not obtained includes but not limited to a executable program, encryption program, secure web browser, scriptin within browser, script within dialog, or script within new web page, from a hosted web page, contents, or sub-contents inside dialog, web app view, web site, and web application.

All embodiments or According to some embodiments of allowing the continuation to serve a composite website or activation or termination of a composite website, dialog, web app view, web application, can have the capabilities to receive placards from a certain time designed by web application, web app view, or dialog or by a third party that has an API, Web Service, or non-related to government.

All embodiments or According to some embodiments of allowing the continuation to serve a composite website, activation, or termination in a script within browser, web application, dialog, web app view, smart phone app, near-field communication, bluetooth in low light or high light connection, QR-codes, biometrics.

All embodiments or According to some embodiments of allowing the continuation to serve a composite website, activation, or termination can be a dialog, web application, smart phone application, web app view, near-field communication, bluetooth in low light or high light connection, QR-codes, biometrics, text messaging.

All embodiments or According to some embodiments for network protocols include but not limited to: transparently providing the application with the simultaneous use of multiple channels by multiplexing data from the application across a set of available channels by exposing a link layer through activation of DPI, dialog, user profile, vehicle object. Multiplexing Transport Protocol, Bandwidth Application Protocol, 33.6 Kbps POTS (IP), 128 Kbps ISDN, 384 Kbps ISDN, 10 Mbps LAN (IP).

All embodiments or According to some embodiments having an program to includes but not limited to instruct a user to go to the closer network router, reduce interface by other appliances, secure better connection find the best routing channel, in their location by using, Secure Web Browser, GPS, Cell Towers, the layout of ones property, configured in the user's profile or automatically. Also, instructions regarding the measurement of lighting.

All embodiments or According to some embodiments having an program to includes but not limited to a computer generated image of an optotype on a in any order of dialog, web app view, web application, application. on a separate computing device, on computing device, and on a microcontroller.

All embodiments or According to some embodiments includes but not limited to: website, dialog, web app view, web application, application, smart phone application in any order.

All embodiments or According to some embodiments includes but not limited to placards can be images on vehicles taken by a user, third party, separate entity computing device or any other device that allows to capture images.

All embodiments or According to some embodiments includes but not limited to placards being magnets on vehicles and objects. Also, using the images from an authentication captcha program or interface.

OCROPUS—a document analysis and optical character recognition (OCR) system. Once reading the information from the scanned image, it can validate the information scanned with a state, city, agency or government jurisdiction database to satisfy the requirements associated with the citation and accept payment or direct the user to make payment.

DETAILED DESCRIPTION

As briefly described above, web pages may be hosted with the contents of a vehicle documentary object with a dialog or a web app view hiding select elements of the hosted web page when in a dialog, implementing different behaviors for contents and hyperlinks inside or outside a dialog or a web app view, and inferring a size of a dialog or a web app view from its contents. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As described above, a cross-browser dialog platform that supports the location and enablement of sub-contents by hosting web pages in a dialog or web app view, such that a web page may be used inside or outside a dialog or web dialog to specifying separate behaviors for the links includes and to serve the composite of a new web page based on vehicle object with activation based on color placards through assessing visual acuity using a video image of a optotype chart obtained with the standard focal length and aperture of computing device and compare the remote images transmitted using various bandwidths and connection protocols.

Figure 1:
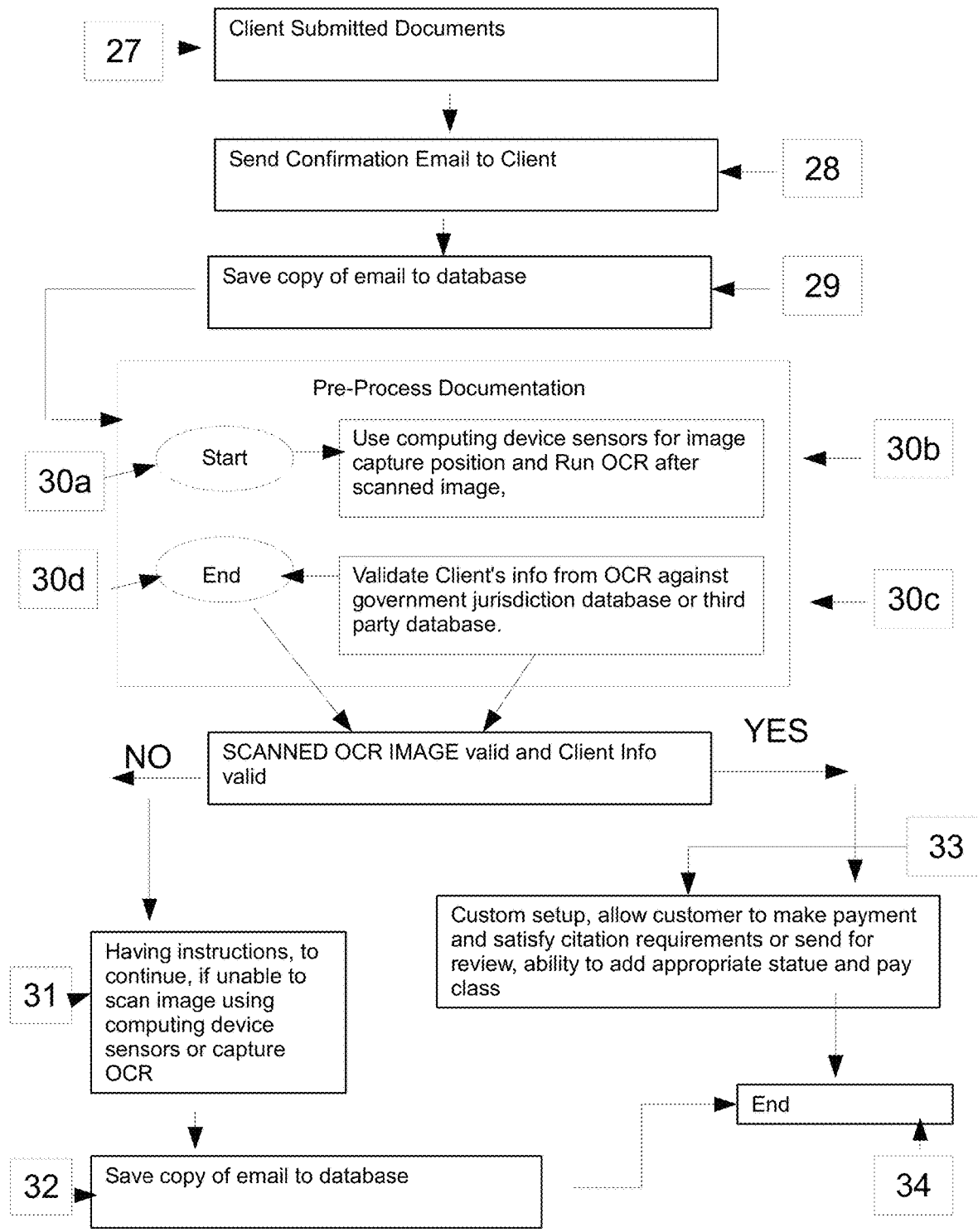
FIG. 1 represents a block diagram illustrating the system for verifying client or user submitted compliance documents wherein system automates the process using an OCR program and a computing device camera sensors. If OCR, Client Information, or DPI not obtained, having instructions to continue.
Figure 2:
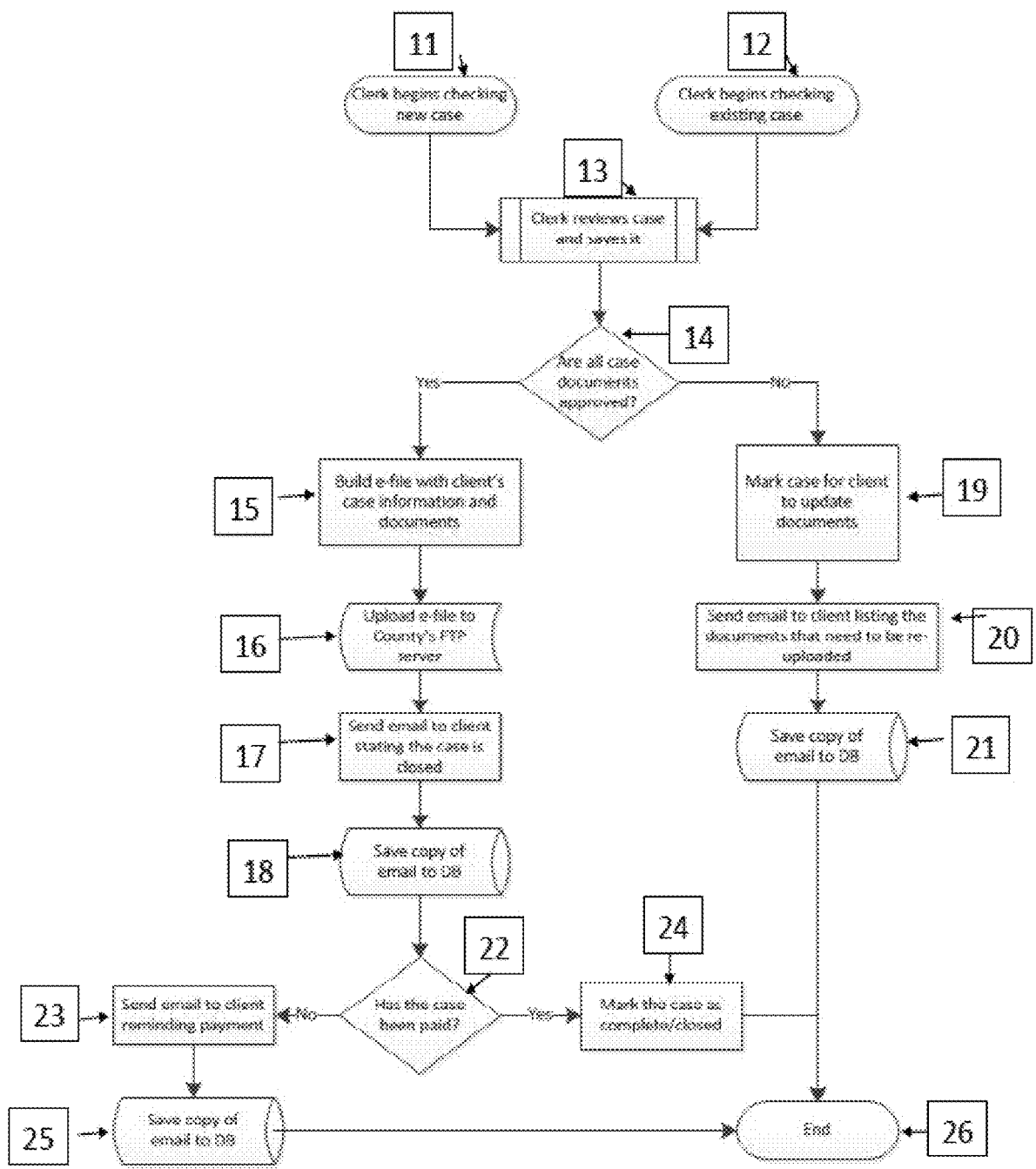
FIG. 2 shows a block diagram representing an embodiment of the system wherein the process is automated (without the use of a court clerk) and a user or client submits documents and a detailed representation of the automated document verification stage.

Referring now to the drawings, it can be seen in FIG. 1 that a user or client submits documents in step 27. The documents may include a driver's license, tag/registration, insurance, proof of compliant equipment, etc. As seen in FIG. 1, once the system receives the documents it sends a confirmation email to the client or user. At which point a copy of the email is saved to the system's database as shown by step 29. A user can enter information with a query directly to their database using suitable software, such as a php script, API, or equivalent. As shown in FIG. 2, the system then starts the image and information verification process in step 30*a*. In this alternate embodiment, step 30*a* can be employed automatically independent of any clerk involvement. The system then checks the image dots per inch (DPI) in step 30*b* using PHP, JAVA, Javascript or the computing device camera sensors for the web application or the same means or a CGImage source for a phone application. It can read the information from the scanned image in step 30*c* using JAVA Computer Vision or OCROPUS—a document analysis and optical character recognition (OCR) system after being uploaded through the computing device camera sensors. Once reading the information from the scanned image, it can validate the information scanned with a state, city, agency or government jurisdiction database to satisfy the requirements associated with the citation and accept payment. Once this is finished, it marks the end of the document verification process of the system as shown in step 30*d*. If the DPI, OCR, or the information on the document is not valid when checked with the agency's database, the system having instructions to continue as shown in step 31. This can be done using php script, html, or java script.

To verify whether the information matches the agency's database, the system can sync its SQL database with the agency's and can use API or HTML to obtain the information, this is called JSON or Parcer. After the email is sent to the client stating the problems with the documentation, a copy of the email is saved to the database, as shown in step 32. If the DPI and information is valid, the case is marked for the clerk or authorized personnel to check it, as shown in step 33. This then marks the end of the verification process shown in FIG. 2.

Figure 3:
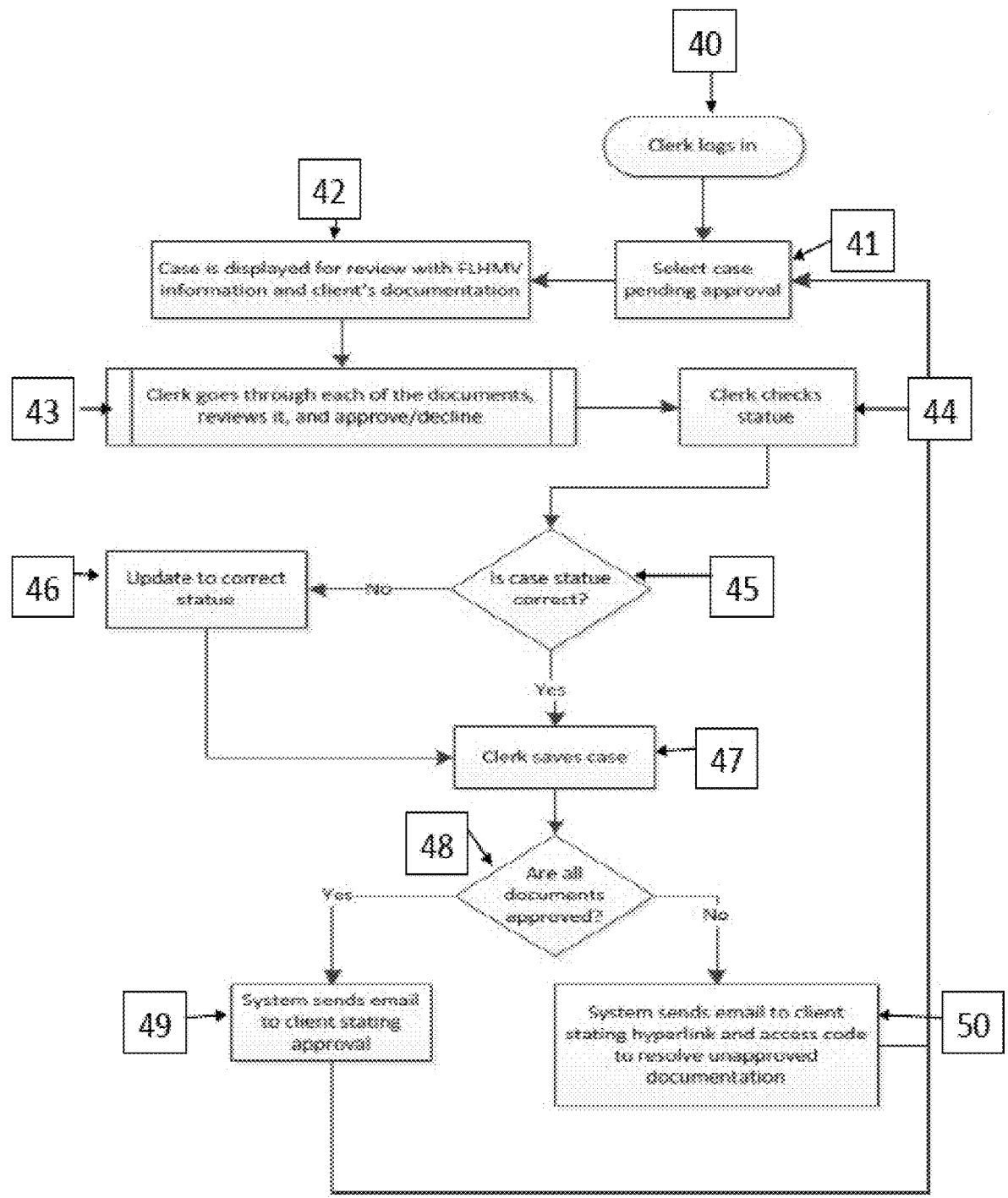
FIG. 3 illustrates a block diagram showing the system for verifying user submitted compliance documents wherein a clerk works with the system to verify whether the documents comply with the statute(s).

FIG. 3 shows an alternative embodiment wherein the court clerk or authorized personnel begins the validation process once he or she receives the case. The clerk or authorized personnel then logs in as shown in step 40. The clerk or authorized personnel selects a case pending approval as shown in step 41. The case information, including the agency's information and client's documentation is then displayed to the clerk or authorized personnel in step 42. The clerk subsequently checks the statute or statutes relating to the citation involved in the case as shown in steps 43 and 44 to reconfirm that all the documents are correct and comply with the statute. The clerk or authorized personnel confirms that the correct statute is being used in that case as shown in step 45. If the correct statute is not being used then the clerk or authorized personnel updates it to the correct statute as shown in step 46. After verifying that the statute (the pertinent law) pertains to the citation at issue, the clerk saves the case as shown in step 47 and confirms that the documents were approved in step 48.

At which time the system sends an email using one of the methods described above to the user or client stating approval as shown in step 49, or alternatively, sends an email to the client including a hyperlink and access code wherein the user or client can resubmit complying documentation as shown in step 50. These final steps in FIG. 3 are similar to those shown in FIG. 2 wherein if the documents not approved in step 14 of FIG. 2, then the system marks the case for the client to update the documents in step 19.

FIG. 2 shows an embodiment wherein a court clerk uses the system to process and validate user submitted documents. As seen in FIG. 2, the embodiment begins with step 11 wherein a clerk receives a new case. Alternatively, as shown by step 12 a court clerk or authorized personnel begins checking an existing case. At step 13, the clerk reviews the case and saves it. The clerk or authorized personnel reviews the case based on the documents. The system then sends an email to the client or user regarding the documents that need to be re-uploaded in step 20 and a copy of the email is saved in the database as shown in step 21. At this point the process ends at step 26. Alternatively, as shown in FIG. 2, if the documents do comply with the agency's requirements, the system builds an e-file, as seen in step 15, with the client or user's case information that was entered by the user and verified by comparing the user submitted documents with the client's information on the agency' database. The system then uploads creates e-file to the agency's FTP server as shown by step 16. The system then sends an email to the client stating that the case is closed as shown in step 17. A copy of the email is then saved to the agency's database as shown by step 18. As shown in FIG. 1, the system then prompts the user or client to provide payment as shown in step 22. Once a client or user pays, the case is complete as shown by step 24 and the system's process concludes as shown by step 26. In the alternative, if the case has not been paid, an email is generated by the system reminding the client or user to provide payment as shown by step 23.

Afterwards, a copy of the payment reminder email is saved to the system's database as shown by step 25 and the system's process concludes as shown by step 26. The present application will employ a memory function to retain photographs and scanned documents uploaded by users.

What is claimed is:

1. A system for the submission and verification of documentary evidence to satisfy at least one outstanding citation comprising:
    a server, a computing device comprising at least one processor and memory that contains instructions that are readable by the processor and cause the computing device to:
    wherein said server receives a citation related to a user, at least one violation, and an update to a current status;
    wherein the server checks a database coupled to the computing device for requirements associated with the at least one violation to satisfy the citation and update the current status of the citation; wherein the requirements associated with the violation is at least one of a driver's license, tag/registration, insurance or defective equipment that requires compliance documentation;
    wherein the server receives compliance documentation required to satisfy the citation and updates the current status;
    wherein the server synchronizes the database with an agency database to access an application programming interface (API) of the agency database, wherein the database updates a dots per inch (DPI) requirement for submitted documentation to match a DPI requirement for submitted documentation in the agency database, wherein the agency database is associated with at least one of a jurisdiction of a state, city, or county;

wherein the server analyzes the documentation to determine the DPI;

wherein the server compares the DPI of the documentation to the DPI requirement; and wherein the server determines the documentation complies with the DPI requirement, update the current status indicating the options to satisfy the citation for submitted compliance documentation.

2. The system set forth in claim 1, wherein said submitted documentation is scanned from various angles through sensors located on said computing device.

3. The system set forth in claim 1, wherein updating the current status includes approving and validating from a highway and motor vehicle data base.

4. The system set forth in claim 1, wherein the documentation complies with an optimal size requirement or the documentation required to satisfy the citation and update the current status, can be scanned and analyzed through JAVA computer Vision or OCROPUS (OCR).

5. The system set forth in claim 1, wherein satisfying the citation requirements or updating the current status includes a communication address of a user.

6. The system set forth in claim 1, wherein the documentation complies with an optimal size requirement to ensure that the submitted documentation is of an optimal size to require a minimum possible bandwidth while retaining clarity.

7. The system set forth in claim 1, wherein the documentation submitted for review of the citation to be resolved includes an interface that can be personalized or connected to a government jurisdiction to be able to resolve the citation.

8. The system set forth in claim 1, wherein a user can receive an access code to an interface to verify, manipulate, or satisfy citation requirements during the submission of compliance documents or after a review process of government jurisdiction after entering or submitting requirements.

9. The system set forth in claim 1, wherein the interface includes a secure php, web service, API, web API, web application, web service, networked communication smart phone application, script within a browser, microcontroller, or secure browser.

10. The system set forth in claim 1, further including validating documentation with instructions to continue automatically if a vehicle document object is not obtained.

11. The system set forth in claim 1, further including validating documentation with instructions to terminate updating the current status or turn off automatically if a vehicle object is not obtained.

12. The system set forth in claim 1, wherein an individual can manually approve required documents associated with a citation to satisfy citation requirements.

13. The system set forth in claim 1, wherein said system can direct a user to make a payment or accept a payment.

14. The system set forth in claim 1, wherein the computing device includes an interface which allows for the manipulation of a vehicle through an operating system program or a client program.

15. The system set forth in claim 1, wherein an automatically satisfying citation requirement can be transmitted within a vehicle's operating system program or client program or a device associated with the vehicle.

16. The system set forth in claim 1, further including analyzing an optimal size requirement for the submitted documentation using placards and to satisfy the requirements associated with a citation.

17. The system set forth in claim 1, including analyzing an optimal size requirement for the submitted documentation with an optotype or Snellen chart.

18. The system set forth in claim 1, further including satisfying requirements associated with a citation including OCR, biometrics, NFC, Bluetooth connection, certificates, and QR codes.

19. The system set forth in claim 1, wherein said API is generated for third parties outside of the agency database.

20. The system set forth in claim 1, wherein authentication, approval, or validation occurs through a secure web browser that communicates with a microcontroller.

* * * * *